Dec. 21, 1926.
O. H. ANDREWS
1,611,400
ROLLING RUBBER FABRICS FOR TIRES
Filed April 16, 1925
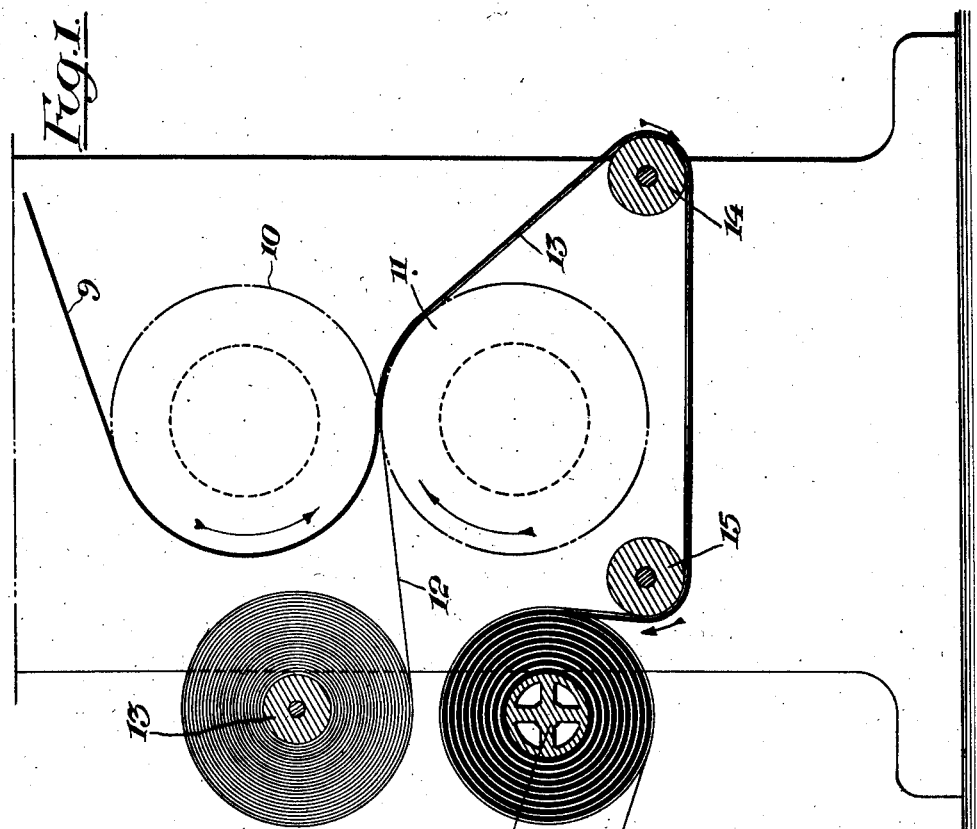
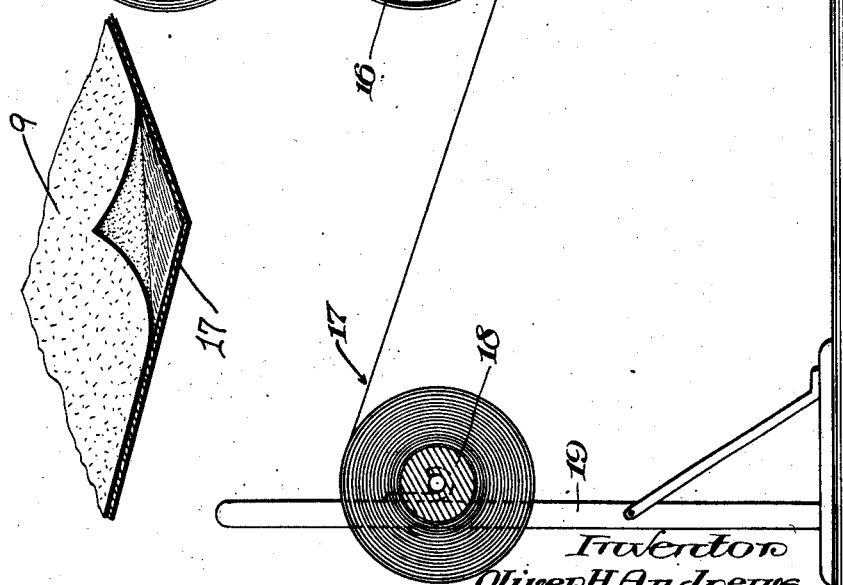
Inventor
Oliver H. Andrews
by his Attorneys,
Weed & Gray Patented Dec. 21, 1926.

1,611,400

UNITED STATES PATENT OFFICE.

OLIVER H. ANDREWS, OF STAMFORD, CONNECTICUT.

ROLLING RUBBER FABRICS FOR TIRES.

Application filed April 16, 1925. Serial No. 23,519.

This invention relates to unvulcanized rubber composition and has to do with means for wrapping and preserving the same, an object of the invention being to provide a suitable yet inexpensive protective medium for preserving the tacky surface of a fresh unvulcanized rubber composition.

This invention more particularly relates to the rolling or reeling of rubber or rubberized fabrics, particularly in the manufacture of rubber tires or tubes, the purpose of the invention being to enable raw rubber or fabrics having raw rubber coating to be wound and supported in large rolls and at the same time protecting and preventing the rubber surfaces form contacting or in any way sticking, either together or to a separating medium so that the surfaces of the rubber fabric will at all times remain in unimpaired condition thereby eliminating considerable waste of rubber material.

One object of this invention is to enable the provision of rolls of rubber or rubberized fabric of any desired size and weight in which the layers or convolutions of the rubber fabric on the reel or support are separated by a protecting sheet or liner comprising a suitable fabric provided with coatings of treated cellulose xanthate or viscose, which in contact with the raw rubber surfaces under any pressure will not stick to the rubber thereby eliminating any tendency as heretofore of impairing the surfaces of the rubber.

Other objects of this invention will appear in the following description and appended claims, reference being had to the accompanying drawings forming a part of this specification, wherein like reference characters indicate corresponding parts in the several views and wherein Fig. 1 is a diagrammatical view illustrating in general the manner in which the rolling of the rubber fabric may be accomplished and illustrating a rolled rubber fabric having a separating medium comprising a fabric coated with regenerated cellulose; Fig. 2 is a fragmentary perspective view showing superimposed layers of the rubber or rubberized fabric and the liner fabric.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the manufacture of rubber tires, the tire fabric when prepared, is wound on a support to form relatively large rolls. Ordinarily the fabric is provided with coats of raw rubber and the surface of the rubber is gummy and adhesive. A supporting strip or liner of suitable cloth fabric is usually interposed between the windings or layers of rubber fabric when rolling up the fabric, or when rolling up sheets of raw rubber. This untreated cotton fabric has small fibres which form a fuzz on the surface of the material, and cling to the rubber with considerable tenacity, and frequently causing a strong enough adhesion to pull the gum out of shape or cause the rubber coating to pull off on the liner when it is unrolled. This results in spoiling and impairing the gum of the raw rubber sheet or rubberized fabric and renders its further use impracticable.

It has been attempted to use as a liner a fabric coated with linseed oil, but this has been found impracticable, not only on account of the great expense incident thereto, but on account of the fact that the linseed oil rarely lays down effectively the short projecting fibres or lint of the cloth and at most has a temporary effect and must be continuously applied to the fabric at great expense.

I have discovered that by rolling up the raw rubber or rubber coated fabric with a separating strip of material coated with regenerated cellulose, the surfaces of the raw rubber or gum will be protected against any tendency to adhere or cling to the liner. The fabric liner may be coated on both sides in any suitable manner. For instance, a cellulose material such as cotton waste, wood pulp or the like is subjected to the action of caustic soda to form an alkali cellulose which is pressed out or otherwise treated to remove the excess of caustic soda, and thereupon treated with carbon disulphid forming cellulose xanthate to which is added a suitable quantity of water. The viscous or gelatinous liquid thus formed is applied to both sides of the fabric as by means of a spreader or doctor blade and may be set or coagulated by vacuum process or heat treatment, or may be treated with dilute sulphuric acid or fixed in any other suitable manner. The resulting fabric is thus provided at each side with a coating of regenerated cellulose, which if it has been acid treated is, after washing to remove the excess acid, pliable and flexible and presents smooth glazed-like surfaces which I have found will not adhere to the surfaces of raw gum or rubber even under considerable pressure. Not only does this flexible regenerated cellulose coating lay down thoroughly the small fibres or fuzz of the cloth fabric, but forms a smooth, non-adhesive surface which will not cling to the raw rubber when the surfaces of the regenerated cellulose and rubber are brought together.

Referring to the drawings, I have illustrated diagrammatically a manner in which a tire fabric coated with gum or raw rubber is rolled up together with a regenerated cellulose coated fabric. The strip of raw rubber or gum 9 is passed through a pair of calender rolls 10 and 11 rotated by any suitable mechanism in the direction of the arrows. The tire fabric 12 which is carried on a suitable roll 13 is also directed between the calender rolls 10 and 11 and the gum or rubber 9 is applied in a coating to the surfaces of the fabric 12. The rubber coated fabric 13 may then be guided over suitable rollers 14 and 15, to a reel or support 16 which is rotated by suitable mechanism at a predetermined speed. The liner fabric 17 coated on opposite sides with regenerated cellulose is carried on a reel 18 suitably supported on a standard 19, and this liner 17 is wound simultaneously with the rubber fabric 13 upon the reel 16. The winding or reeling of the rubber and liner fabrics on the support 16 results in causing considerable pressure between the surfaces of the regenerated cellulose and the raw rubber, and especially where the fabrics are wound in large rolls having considerable size and weight. I have found however that the regenerated cellulose surfaces will not stick to the gum or raw rubber under any pressure, so that as a result the percentage of loss as heretofore due to the impairment of the rubber in the rolls is entirely eliminated thereby resulting in a further appreciable saving in the cost of manufacture of rubber tires or other rubber goods and enabling the preparation of the rolls of rubber fabric to be accomplished at a great saving in expense.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. The rolling of rubber fabric on a support with a separating strip of regenerated cellulose between the layers of rolled fabric and forming a non-adhesive protecting medium in contact with the rubber surfaces of the rubber fabric.

2. The rolling or winding of a raw rubber strip on a support with a separating strip coated with regenerated cellulose interposed between the windings of the rubber strip and forming a non-adhesive protecting medium in contact with the rubber surfaces of the rubber strip.

3. The rolling or winding on a support of a fabric coated on both sides with raw rubber and with a separating strip of fabric coated on both sides with regenerated cellulose interposed between the layers of rubber fabric on the support.

4. The rolling or winding of a rubber coated fabric on a support with a separating strip of cloth fabric coated with regenerated cellulose interposed between the windings of the rubber fabric and forming a non-adhesive protecting medium in contact with the rubber surfaces of said rubber fabric.

5. A support and a strip of raw rubber wound thereon in layers and having a protecting strip of material coated with regenerated cellulose interposed between the layers and forming a non-adhesive protecting medium in contact with the rubber surfaces.

6. A support and two strips of material placed thereon in layers, one strip having a raw rubber surface and the other strip having a surface of regenerated cellulose forming a non-adhesive and protecting medium in contact with the raw rubber surface.

7. A support and two strips of material wound thereon in layers, one strip comprising a fabric having a raw rubber coating and the other strip comprising a fabric having a coating of regenerated cellulose forming a non-adhesive protecting medium in intimate contact with the rubber surface.

8. The combination of a strip of material having an adhesive rubber surface, and a non-adhesive strip thereon having a non-adhesive surface of regenerated cellulose.

9. The combination of a strip of material having an adhesive rubber surface and a non-adhesive strip thereon having a non-adhesive surface of regenerated cellulose formed by the regeneration of cellulose xanthate or viscose.

10. A method of preserving the tackiness of an unvulcanized rubber surface which comprises covering the surface with a textile material coated with regenerated cellulose.

11. A material for protecting a plastic surface comprising a fibrous material coated with regenerated cellulose.

12. A material for protecting a raw rubber composition comprising a fibrous sheet material coated with a regenerated cellulose composition.

13. A material for protecting a raw rubber composition comprising a fabric material rendered impervious by a regenerated cellulose composition.

14. A material for protecting a raw rubber composition comprising a fabric material coated with viscose regenerated to form regenerated cellulose.

15. A vulcanizable rubber member comprising an unvulcanized rubber composition provided with a protecting coating including fabric treated with regenerated cellulose.

16. A vulcanizable rubber member comprising an unvulcanized rubber composition provided with a protecting coating including fabric treated with a regenerated cellulose composition.

Signed at 1822 Park Row Bldg., New York city, county and State of New York this 11th day of April, 1925.

OLIVER H. ANDREWS.